United States Patent [19]
Angleraud et al.

[11] Patent Number: 5,145,583
[45] Date of Patent: Sep. 8, 1992

[54] ASYMMETRIC SEMIPERMEABLE MEMBRANE FOR THE TREATMENT OF BIOLOGICAL FLUIDS

[75] Inventors: René Angleraud, Feyzin; Claude Brun, Lyon, both of France

[73] Assignee: Hospal Industrie, Meyzieu, France

[21] Appl. No.: 632,388

[22] Filed: Dec. 21, 1990

[30] Foreign Application Priority Data

Dec. 22, 1989 [FR] France .................. 89 17397

[51] Int. Cl.$^5$ .......................................... B01D 71/42
[52] U.S. Cl. .................... 210/646; 210/651; 210/500.23; 210/500.43; 427/246
[58] Field of Search .......... 210/500.43, 500.25, 210/651, 646; 264/41, 49; 427/245, 246

[56] References Cited

U.S. PATENT DOCUMENTS 4,276,172  6/1981  Henne et al. ............. 210/500.23 X
4,749,619  6/1988  Angleraud .................. 428/398
4,828,705  5/1989  Thakore et al. ............... 210/636

FOREIGN PATENT DOCUMENTS 250337  12/1987  European Pat. Off. .
2096941 10/1982  United Kingdom .

OTHER PUBLICATIONS

*Desalination*, Elsevier Pub., Amsterdam, 70:277-292 (1988).

Primary Examiner—Frank Spear
Attorney, Agent, or Firm—Bell, Seltzer, Park & Gibson

[57] ABSTRACT

An asymmetric semipermeable membrane and processes for the manufacture thereof are disclosed. The membrane comprises at least one hydrophobic polymer and at least one copolymer based on acrylonitrile, at least one sulphonic monomer which is optionally salified, and optionally at least one non-ionic, ionizable, olefinically unsaturated monomer. The membrane is useful in the treatment of biological fluids such as plasma or blood, especially using plasmapheresis, or with the aid of an artificial kidney using hemodialysis and/or ultrafiltration.

45 Claims, 2 Drawing Sheets

ASYMMETRIC SEMIPERMEABLE MEMBRANE FOR THE TREATMENT OF BIOLOGICAL FLUIDS

FIELD OF THE INVENTION

The invention relates to asymmetric semipermeable membranes suitable for the treatment of biological fluids. It relates particularly to asymmetric semipermeable membranes for use in artificial kidneys in conjunction with hemodialysis, ultrafiltration and/or plasmapheresis.

BACKGROUND OF THE INVENTION

Semipermeable membranes for blood treatment based on acrylonitrile copolymers are known. Satisfactory acrylonitrile copolymers are disclosed in U.S. Pat. No. 4,749,619. Such membranes are symmetrical, semipermeable hollow fibers having a homogeneous mesoporous structure and a composition which is substantially uniform throughout their thickness. These fibers comprise a copolymer of acrylonitrile and an olefinically unsaturated comonomer bearing sulphonic groups which may be salified.

The fibers are obtained by lowering the temperature of a polymer solution extruded from a die until a homogeneous gel structure is obtained, followed by a washing operation and then a stretching operation. Hollow fibers produced have remarkable permeability characteristics for dialysis and ultrafiltration, and exhibit excellent biocompatibility.

However, these membranes have some disadvantages. For example, they must be stored in a moist state or be impregnated with a hygroscopic substance having a low vapor pressure such as glycerine. Otherwise, they irreversibly lose their permeability and mechanical characteristics, and thus become relatively useless in hemodialysis.

Asymmetric semipermeable membranes are also known in the medical field. They comprise a hydrophobic polymer and a hydrophilic polymer and are employed for blood treatment. For example, European Patent No. 168,783 discloses a microporous membrane based on a hydrophobic polymer and a water-soluble hydrophilic polymer chosen and employed as a pore-former. The hydrophilic polymer is substantially extracted by a precipitating liquid at the die exit. The remaining hydrophilic polymer is also extractable by an aqueous medium, a process step that is undesirable in medical applications.

Semipermeable membranes based on hydrophobic and hydrophilic polymers have been used in other fields, namely industrial ultrafiltration and micro-filtration. U.S. Pat. No. 4,810,384, for example, discloses a hydrophilic and dryable semipermeable membrane based on polyvinylidene fluoride (PVDF) and a hydrophilic polymer. By way of example of hydrophilic polymers, this patent discloses copolymers of acrylonitrile and monomers containing sulphonic groups. In particular, it discloses copolymers of acrylonitrile and sodium methallylsulphonate, optionally with methyl methacrylate. In accordance with the teachings of the patent, a semipermeable, hydrophilic and dryable membrane is obtained from a homogeneous solution of PVDF and a hydrophilic polymer, which is shaped and then coagulated without losing its characteristics.

SUMMARY OF THE INVENTION

An objective of the present invention is to provide an improved semipermeable membrane suitable for the treatment of biological fluids which are intended to be recirculated to a human or animal body.

Another objective of the present invention is to provide a semipermeable membrane having excellent performance characteristics, biocompatibility, and which also does not have the defects of the prior art membranes.

The term "semipermeable" is intended to mean good water permeability, and selective permeability to molecules of a size determined according to the envisaged medical application, e.g. plasmapheresis or hemodialysis. For example, in hemodialysis the membrane must be permeable to metabolites such as urea, creatinine, "average molecules," and to the solutes of relatively higher molecular weight. It must remain impermeable to blood proteins whose molecular weight is higher than or equal to that of albumin.

The term "biocompatibility" is intended to mean a biologically compatible membrane which produces little or no change in the biological parameters. More precisely, a membrane is biocompatable if it is inert with respect to the two main defense mechanisms of an organism, namely hemostasis and immunity. Hemostasis provides the organism with protection against the loss of blood, inter alia, caused by coagulation which is triggered when the blood comes into contact with a thrombogenic surface.

Another objective of the present invention is to provide a semipermeable membrane having excellent mechanical properties.

Yet another objective of the present invention is to provide a semipermeable membrane which retains its characteristics, particularly its rigidity and dimensional stability, when it changes from the dry state to the wet state or vice versa, and when it is stored in the dry state, without the necessity of any special, physical or chemical treatment.

Yet another objective of the present invention is to provide a semipermeable membrane which is substantially non-toxic.

Yet another objective of the present invention is to provide a semipermeable membrane which is devoid of any substances capable of being extracted by aqueous media such as biological fluids, e.g. blood, plasma, etc. or a dialysis fluid.

Yet another objective of the present invention is to provide processes for preparing such semipermeable membranes which can be conducted easily under mild conditions which do not involve chemical reactions or require the presence of special additives susceptible of being extracted during treatments, thus making it possible to obtain membranes free from traces of reaction residues.

DETAILED DESCRIPTION OF THE PREFERRED EMBODIMENT

Figure 1:
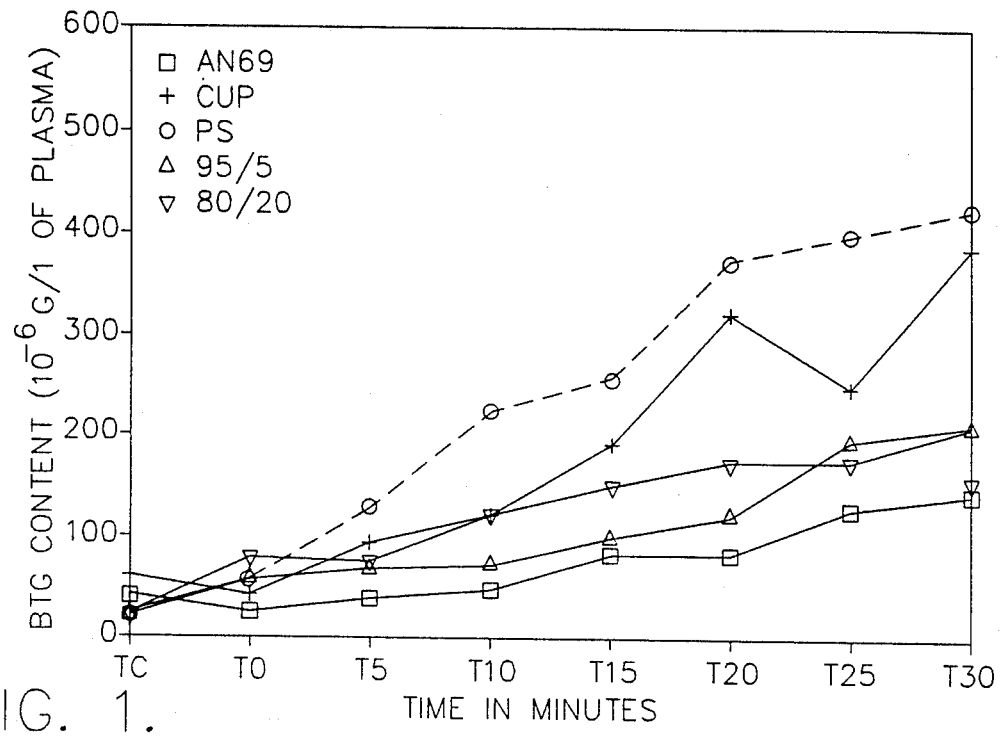
FIG. 1 is a graph illustrating the change in the concentration of $\beta$TG ($\beta$-thromboglobulin) in an ex-vivo blood sample per unit time when subjected to dialysis using membranes according to the present invention and control membranes.

These and other objectives are accomplished by providing an asymmetric semipermeable membrane comprising a support layer and at least one mesoporous, microporous or dense surface layer, hereinafter called a "separating layer." The membrane is suitable for the treatment of biological fluids intended to be recirculated to a human or animal body, such as blood or plasma. The membrane is based on at least one hydrophobic polymer and at least one water-insoluble copolymer (hereinafter "copolymer"). The copolymer is based on acrylonitrile, at least one sulphonic monomer, optionally salified, and optionally, at least one non-ionic, nonionisable and olefinically unsaturated monomer. The surface concentration of copolymer in the separating layer is higher than the mean copolymer concentration in the membrane as a whole.

This membrane is water-wettable in the dry state, and the respective proportions of the copolymer and the hydrophobic polymer are varied so that the dimensional change of the unsupported membrane does not exceed +3% when it changes from the dry state to the wet state at 40° C.

A "water-wettable" semipermeable membrane is intended to mean a membrane wherein penetration by water occurs spontaneously without stress such as applied pressure.

"Dry state" is intended to mean the hygrometric stability state of the membrane with the surrounding atmosphere. In that state, the weight loss of the membrane resulting from a treatment at 40° C. for 24 hours in a ventilated oven is less than 0.5%.

In accordance with a preferred embodiment of the present invention, the respective proportions of the copolymer and the hydrophobic polymer are adjusted so that the dimensional change of the unsupported membrane does not exceed +2% when it changes from the dry state to the wet state at 40° C. In addition, no shrinkage occurs under these conditions.

According to the present invention, the expression "asymmetric semipermeable membrane" denotes any semipermeable membrane having one or two separating layers which differ from the remainder of the membrane in that they have pores of smaller size. Membranes having a so-called pore gradient structure are also included in the present invention. The size of the pores in the separating layer can be varied according to the intended application of the membrane.

In hemodialysis, pore size is generally of the order of a few hundred angstroms or less. The separating layer is considered dense when the pore size is less than 10 angstroms. When the pore size varies between 10 angstroms and a few hundred angstroms, the separating layer is characterized as mesoporous. In plasmapheresis, pore size is of the order of a few tengths of a micrometer, wherein the separating layer is said to be microporous. Such a separating layer forms the layer actively responsive for a large part of the selective impermeability of the molecules above a specified size. It is advantageously arranged so as to be in physical contact with the biological fluids to be treated. The remainder of the membrane will be referred to hereinafter as the support layer.

The average size of the pores may vary continuously according to the thickness of the membrane. This structure is referred to as having a pore gradient. In the alternative, the variation of the average size of the pores may be noncontinuous, there may be relatively fine pores in the separating layer, and pores of a markedly larger size in the support layer. For example, the support layer may have a finger-type structure and/or an alveolar structure with or without vacuoles.

It has surprisingly been found that the membrane according to the present invention achieves the forementioned objectives despite having a limited copolymer content. The maximum acceptable total weight % of the copolymer in the membrane is essentially a function of the chemical nature of the hydrophobic polymer employed. A copolymer content in the membrane which does not exceed 40% by weight (% relative to the total weight of polymers in the membrane) is preferred. The best performances are obtained with membranes containing not more than 30% by weight of copolymer.

It has also been found that the performance characteristics of the membrane according to the present invention are related to a surface enrichment of the separating layer in copolymer. This enrichment is responsible for the excellent biocompatibility of the membrane. The term "enrichment" means that the copolymer concentration at the surface of the separating layer is greater than the mean concentration of copolymer in the membrane. In contrast, the membranes disclosed in U.S. Pat. No. 4,810,384 do not have any surface enrichment in copolymer. Also, the membrane according to the present invention is sufficiently hydrophilic to ensure a high hydraulic permeability, even when it is in the dry state. The preferred surface concentration of copolymer at the outermost surface of the separating layer is at least 30% by weight. It is at such surface concentrations that the best performance characteristics are attained.

The semipermeable membrane in accordance with the present invention has many advantageous properties. It has a moderate to high hydraulic convection permeability, and is capable of being adjusted to accommodate the intended application. It also exhibits a diffusive permeability and a selectivity for molecules of a predetermined size according to the intended medical application. It is non-toxic, especially since it contains substantially no extractable substances. In addition, the membrane does not require any particular treatment for its preservation, such as for example, a deposition of a hygroscopic substance. Equally, the membrane according to the invention does not cause hemolysis when subjected, for example, to the experimental conditions described in DIN standard 58,361, part 4. Moreover, the membrane according to the present invention is not cytotoxic. It also exhibits good biocompatibility both from the standpoint of both hemostasis and immunity. It also possesses satisfactory mechanical characteristics, in particular a good dimensional stability when the membrane changes from the dry state to the wet state or vice versa, and a good rigidity. This rigidity is such that, when the membrane is formed into a hollow fibre, it is not necessary to structure the bundle of fibres in any particular way inside a treatment apparatus to have unrestricted circulation of the fluid in the fibres.

As stated above, the semipermeable membrane according to the present invention may be in the form of a planar membrane or a hollow fibre. A membrane in the form of a hollow fibre has an outer diameter of approximately 1,000 micrometers or lower, preferably lower than 500 micrometers, and a wall thickness which is generally between 10 and 200 micrometers, preferably between 20 and 80 micrometers.

When the membrane is in the form of a hollow fibre, the separating layer is advantageously situated on the inner wall of the fibre. If desired, the membrane may also comprise a separating layer on the outer wall.

When it is in the form of a planar membrane, the thickness of the membrane generally varies between 10 and 500 micrometers, preferably between 20 and 300 micrometers.

In accordance with the present invention, a "hydrophobic polymer" is intended to mean a polymer which has little affinity for aqueous media and which has good dimensional stability when it changes from the dry state to the wet state. The hydrophobic polymer chosen is preferably such that, when it is converted into the form of a semipermeable membrane, the latter exhibits a change in thickness or in length not exceeding 0.5% when it changes from the dry state to the wet state. In addition, the hydrophobic polymer must be non-toxic, and in particular must not contain extractable substances.

Polyarylsulphones, polyvinylidene fluorides (PVDF) and polyvinyl chlorides are examples of the hydrophobic polymer which is suitable for the present invention. Among the polyarylsulphones, preferred are the polyarylsulphones containing the following units:

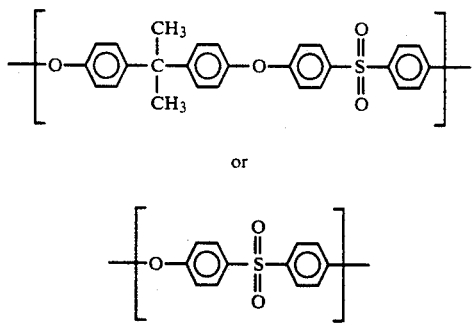

The polyarylsulphones containing unit a) are commonly referred to as polysulphones or PSF. The polyarylsulphones of unit b) are called polyethersulphones or PES.

The copolymer is preferably water-insoluble. The proportion of sulphonic monomer, optionally salified, is between 1 and 50% by weight of copolymer, preferably between 3 and 15%.

The aforementioned copolymers are known per se; they are disclosed in U.S. Pat. No. 4,749,619 and in French Patent 2,105,502. Copolymers based on acrylonitrile and on sodium methallylsulphonate are preferred. Particularly preferred is the copolymer of commercial name AN69 manufactured by Hospal.

The method of preparing the copolymer for use in the present invention is known. The copolymerization process described in French Patent 2,076,854 is advantageously employed.

Examples of the sulphonic monomer suitable for the present invention include vinylsulphonic, allylsulphonic, methallylsulphonic, allyloxyethylsulfonic and methallyloxyethylsulphonic, styrenesulphonic, vinyloxybenzenesulphonic, allyloxybenzenesulfonic and methallyloxybenzenesulphonic acids, and the salts of these acids, preferably alkali metal salts thereof.

Examples of the non-ionic, nonionisable, olefinically unsaturated monomer suitable for the present invention include ethylenic hydrocarbons such as butadiene and styrene; vinyl and vinylidene chlorides; vinyl ethers; unsaturated ketones such as butenone, phenyl vinyl ketone and methyl isopropenyl ketone; vinyl esters of carboxylic acids, for example, the formates, acetates, propionates, butyrates and benzoates; alkyl, cycloalkyl and aryl esters of monoor polycarboxylic unsaturated aliphatic acids such as methyl, ethyl, propyl, butyl and β-hydroxyethyl acrylates, methacrylates, maleates, fumarates, citraconates, mesaconates, itaconates and aconitates.

Depending on the chemical nature of the hydrophobic polymer and the copolymer which are employed, the relative proportions of these two polymers may be varied to obtain a membrane in accordance with the purposes of the present invention. Thus, when the membrane is based on PVDF and copolymer, it is preferred that the overall PVDF/copolymer mass ratio exceeds 70/30 to obtain a membrane which exhibits good dimensional stability. In addition, an overall PVDF/copolymer mass ratio which does not exceed 99/1 is preferred so as to have a sufficient degree of enrichment at the outer surface of the separating layer. An overall PVDF/copolymer mass ratio between 95/5 and 80/20 is preferred.

On the other hand, when the membrane is based on polyarylsulphone as the hydrophobic polymer, the overall proportion of copolymer can be higher than in the preceding case. The overall polyarylsulphone/copolymer mass ratio is preferably at least 60/40. More preferably, this ratio is at least 70/30. However, as will be explained hereinbelow, the values of the lower and upper limits of the respective proportions of hydrophobic polymer and copolymer also vary depending on the process employed for preparing the membranes.

A further subject of the present invention is a first process for the preparation of a semipermeable membrane. The first step of the process comprises preparing a solution consisting of at least one hydrophobic polymer; at least one water-insoluble copolymer based on acrylonitrile, at least one sulphonic monomer, and optionally, at least one nonionic, nonionisable, olefinically unsaturated monomer; at least one organic solvent for the hydrophobic polymer and the copolymer having a boiling temperature higher than the processing temperature of the solution; and at least one nonsolvent for the hydrophobic polymer, and optionally nonsolvent for the copolymer, miscible with the organic solvent. The "processing temperature" is that at which the solution is prepared or used.

The respective proportions of the copolymer and the hydrophobic polymer are varied so that the dimensional change of the unsupported membrane does not exceed +3% when it changes from the dry state to the wet state at 40° C.

The respective proportions of the hydrophobic polymer, copolymer, organic solvent and nonsolvent are varied so that although the solution may be thermodynamically unstable and cloudy, it is nevertheless macroscopically homogeneous, and does not give rise to demixing at the processing temperature. Also, when the temperature of the solution is lowered, the solution simultaneously transforms to a gel state.

The solution thus obtained is then extruded, preferably through a die. Immediately thereafter, the extruded product is coagulated, such as, for example, by partial or total contact with a coagulating liquid chemically inert towards the hydrophobic polymer and the copolymer, and for which the hydrophobic polymer has little or even no affinity, and for which the copolymer has affinity without being soluble therein. The affinity between two substances is the tendency of these two substances to associate by intermolecular interactions. The coagulation is carried out for a sufficient period to solidify the extruded product as a membrane in its desired form. The membrane is then washed, followed, if desired, by drying.

In accordance with a preferred embodiment of the first process, the respective proportions of the copolymer and the hydrophobic polymer are adjusted so that the dimensional variation of the unsupported membrane does not exceed +2% when it changes from the dry state to the wet state at 40° C.

The solution to be extruded is deliberately placed in a state close to thermodynamic instability so as to arrive at a surface enrichment in copolymer. A state close to thermodynamic instability is intended to mean a state close to demixing which, in addition, would be capable of changing spontaneously towards the gel state merely upon cooling. The expressions "thermodynamic instability" and "demixing" are used in the sence defined by Wijmans and Smolders, *Synthetic Membranes: Science, Engineering and Applications*, NATO ASI Series C181 (1986) at pp. 42–46, the relevant disclosures of which are hereby incorporated by reference. "Demixing" corresponds to a separation of a polymer solution into two phases having a different physical composition and/or polymer concentration. This state is seen visually as an absence of clarity; that is, the solution is cloudy, with a color which may vary from bluish to a milky appearance. This results from the incompatibility of the hydrophobic polymer and the copolymer, and from the presence of the nonsolvent in the solution.

The appearance of surface enrichment can be established as follows. The surface composition of the separating layer is determined by photoelectron spectroscopy (ESCA, Electron Spectroscopy for Chemical Analysis). Under the conditions commonly employed in the technique, the depth of the separating layer analyzed is of the order of 50 to 100 angstroms. This analysis shows that the surface concentration of copolymer in the layer is higher than the average concentration of copolymer in the membrane as a whole. In addition, it appears that the actual value of the copolymer surface concentration thus determined is by a default value (less than the actual value) of the effective concentration at the outermost surface of the layer.

Although the analyzed depth is relatively low, a concentration gradient exists over the analyzed depth, meaning that the copolymer concentration increases towards the outermost surface of the separating layer. This is demonstrated by performing an ESCA analysis under special conditions known as angular distribution.

The decrease in the angle of reception of the photoelectrons remitted by the surface layer under the impact of the X-radiation makes it possible to analyze progressively smaller depths from approximately 100 angstroms to approximately 10 angstroms.

The copolymer concentration tends to increase as the depth of analysis decreases, and this shows that a concentration gradient exists from the layers analyzed up to the actual separating layer forming the outermost surface of the membrane. This concentration gradient exists at least over a depth in the order of 50 to 100 angstroms, corresponding to the common conditions of analysis which are employed.

The copolymer concentration in the separating layer can also be determined by measuring the wettability of the layer by water. The surface composition of the outermost surface of the membrane in the case of a given surface topography, determines the degree of wettability by water. The membrane of the present invention is based on a mixture of a hydrophobic polymer which is slightly wettable or not wettable by water and a wettable copolymer as defined above. The membrane therefore exhibits an intermediate degree of wettability, higher than what had been expected, which is proportionately higher as the surface concentration of copolymer increases.

The degree of wettability by water can be used to evaluate the copolymer concentration in the separating layer. A membrane obtained in accordance with the first process according to the invention, having from 5 to 30% by weight of copolymer (relative to the total quantity of polymers), exhibits water wettability characteristics which correspond generally to a copolymer concentration in the separating layer which is higher than 30% by weight.

To prepare a polymer solution in accordance with the present invention, the content of polymers (the term "polymers" denotes the hydrophobic polymer and the copolymer) used is generally between 10% and 30% by weight of the total weight of the solution, preferably between 20% and 28% by weight. In the case of a low content of polymers, e.g. 10%, the membranes produced have an intermediate mechanical strength. Such membranes are advantageously formed into planar membranes and are supported, for example, with the aid of a non-woven material. At relatively higher polymer contents, the solution can be formed into a planar membrane or a hollow fibre.

Solutions having a low polymer content, e.g. containing at least 10% by weight of polymers, facilitate the formation of large-diameter pores and are advantageously employed for preparing plasmapheresis membranes. Solutions with high polymer content, e.g. in the order of 20% to 30% by weight of the solution, result in the formation of membranes whose pores are relatively smaller, and are advantageously employed for the manufacture of hemodialysis membranes. However, solutions with high polymer content may be suitable for the manufacture of plasmapheresis membranes if their preparation is carried out under such conditions which permit the formation of pores whose diameter is of the order of a few tenths of a micrometer. Stretching is an example of such a condition.

Membranes produced from solutions containing greater than 30 wt. % polymers are substantially impermeable.

In accordance with the process according to the present invention, the nonsolvent is a poor solvent or a nonsolvent for the hydrophobic polymer. It may also be a poor solvent or a nonsolvent for the copolymer. Further, it must be miscible with the organic solvent, and preferably be miscible with the coagulating liquid also.

The presence of nonsolvent in the polymer solution enhances the instability of the polymer solution with the coagulating liquid when they are in contact. This promotes the separation of the hydrophobic polymer from the copolymer. The affinity of the copolymer for the coagulating liquid makes a copolymer enrichment of the separating layer.

From 2% to 20% by weight of nonsolvent is introduced into the solution to be extruded, more preferably from 2 to 10% by weight when a strong nonsolvent is used. A strong nonsolvent is intended to mean a nonsolvent which is highly precipitating when employed as the coagulating liquid brought into contact with the solution. Examples of nonsolvents include alcohols such as 2-ethoxyethanol or 2-butoxyethanol; diols such as ethylene glycol, hexanediol, diethylene glycol; and water. A mixture of nonsolvents is also suitable, preferably a mixture of a strong nonsolvent such as water and a weak nonsolvent such as glycerol.

Among the organic solvents which are suitable for the preparation of the solution in accordance with the first process according to the present invention, there may be mentioned N-methyl-2-pyrrolidone (NMP), N,N-dimethylformamide (DMF), N,N-dimethylacetamide, dimethyl sulphoxide, and mixtures of these solvents. A water-miscible organic solvent such as NMP and/or DMF is preferred.

After dissolving and mixing the hydrophobic polymer and the copolymer at a temperature above the gelling temperature, generally at a temperatuare of from 30° to 120° C., preferably of from 50° and 100° C., a cloudy, but nevertheless macroscopically homogeneous solution is obtained.

The solution thus prepared is then extruded. The extrusion operation consists in passing the solution through a slot die to obtain a planar membrane, or through an annular die with an axial orifice and arranged substantially vertically, to obtain a hollow fibre. The planar membrane can also be obtained by casting the solution onto a glass plate, for example. The extrusion is carried out in accordance with various techniques which are well known in the art.

The thus extruded product, having exited the die, is then coagulated by partial or total contact of the extruded product with a coagulating liquid. The coagulation of the extruded product in the form of a planar membrane is generally carried out by immersing the product in a bath of coagulating liquid, or by scanning and spraying one or more walls of the extruded product with the coagulating liquid.

Upon forming the extruded product into a hollow fibre, the coagulation of the inner surface of the hollow fibre is carried out by introducing the coagulating liquid through the axial orifice of the die. The coagulation of the outer surface of the hollow fibre can also be performed by passing it through a bath of coagulating liquid. The inner and outer coagulation of the hollow fibre also may be carried out by subjecting the extruded hollow fibre virtually simultaneously to an immersion in a bath of coagulating liquid and by passing a coagulating liquid through its axial conduit, or by conducting these two coagulation steps sequentially in time.

The coagulation operation contributes to the formation of a separating layer and to the surface enrichment of this layer in copolymer. Furthermore, the average pore diameter is a function in part of the physicochemical nature of the coagulating liquid. Thus, the smaller the average pore size, the greater the precipitating power of the coagulating liquid, and vice versa.

The choice of the coagulating liquid is determined by the intended application. Thus, for the manufacture of a plasmapheresis membrane, a coagulating liquid exhibiting moderate precipitation properties and meeting the other requisite conditions is preferred. Examples include mixtures comprising water and at least one polar solvent such as N-methylpyrrolidone, glycerol or an alcohol, e.g. methanol, ethanol, propanols and butanols.

For the manufacture of a hemodialysis membrane, a coagulating liquid exhibiting high precipitating properties and meeting the other requisite conditions is preferred. Water and mixtures thereof containing at least 50% of water and one or more organic solvents such as those mentioned immediately above are suitable. Aqueous solutions of an inorganic salt such as a water-soluble alkali or alkaline-earth metal salt may also be employed. Advantageously, water or mixtures thereof containing at least 50% of water are used as the coagulating liquid. High copolymer enrichment degrees are obtained therefrom.

During the coagulation operation, the solvents and nonsolvents present in the extruded product are dissolved by the coagulating liquid which consequently becomes diluted. As a result, its coagulating properties thus become diminished. The dilution of the coagulating liquid is greater during the coagulation of the inner surface of a product when extruded in the form of hollow fibre. Thus, in order to have the benefit of a coagulating liquid which retains its precipitating properties as long as possible, and hence to optimize the surface enrichment in copolymer, high flow rates of coagulating liquid are preferably employed.

A relatively slow rate of extrusion, e.g. a relatively low solution flow rate QC is also preferred. Extrusion is intended to mean the speed of exit from the die. The enrichment of the separating layer in copolymer is also enhanced when the extrusion is relatively slow. A solution extrusion rate not exceeding 20 m/min is preferably employed. A relatively slow extrusion rate and a rather high flow rate of coagulating liquid are preferred.

As soon as the membrane reaches a efficiently solidified state whereby it can be stressed mechanically while retaining its shape, it is generally conveyed to a mechanical system, e.g. one or more driving rollers.

The membrane thus obtained is then optionally subjected to a stretching operation, either with the aim of adjusting its porosity and consequently its permeability, or generally, to increase the production efficiency. However, such a stretching operation is not essential to the production of the membrane.

Next, the membrane is subjected to a washing operation by being passed, for example, through one or more successive washing baths to remove most of the residual nonpolymeric constituents, e.g. solvents and nonsolvents, present in the membrane. Aqueous mixtures of organic solvents, especially alcohols such as methanol, are employed as the washing bath. Pure water is preferred. The washed membrane can then be dried in accordance with known techniques.

A second process for the preparation of a membrane in accordance with the present invention is now set forth. A first solution is prepared. It comprises of at least one hydrophobic polymer; at least one organic solvent for the hydrophobic polymer and for the copolymer having a boiling point higher than the processing temperature of the solution; and optionally at least one nonsolvent for the hydrophobic polymer that is miscible with the organic solvent.

Then a second solution is prepared. It comprises at least one water-insoluble copolymer based on acrylonitrile; at least one sulphonic monomer; and optionally at least one non-ionic, non-ionizable, olefinically unsaturated monomer; at least one organic solvent for the copolymer and for the hydrophobic polymer whose boiling temperature is higher than the processing temperature of the solution and which is advantageously identical to the solvent contained in the first solution; and optionally, at least one nonsolvent for the hydrophobic polymer, which is, if desired, a nonsolvent for the copolymer, miscible with the organic solvent and which is advantageously identical to the nonsolvent employed in the first solution. At least one of the two solutions must contain at least one nonsolvent for the hydrophobic polymer as defined above.

The first solution and the second solution are then mixed using a mixing apparatus. The respective proportions of the copolymer and the hydrophobic polymer are varied so that the dimensional variation of the unsupported membrane does not exceed $+3\%$ when it changes from the dry state into the wet state at 40° C. The respective proportions of the hydrophobic polymer, the copolymer, the solvent and the nonsolvent in the thus mixed solution are varied so that the solution is thermodynamically unstable and cloudy, but nevertheless is macroscopically homogeneous, and does not give rise to demixing at the processing temperature; and that when the solution temperature is lowered, the solution spontaneously changes to a gel state. This step is followed immediately by the sequential steps of extruding, coagulating, washing and if desired, drying, as per the first process according to the present invention.

The operating conditions and the processing methods listed above in accordance with the first process are applicable to the second process.

A process of this second type allows for more concentrated solutions, which are thermodynamically more unstable than those prepared according to the first process, as well as higher extrusion rates than those employed for the first process.

Other methods for the preparation of a membrane in accordance with the present invention can be envisaged within the scope of the present invention. For example, the known technique of coextrusion can be employed. More particularly, two solutions can be coextruded simultaneously. The first solution is intended for the preparation of the support layer. It contains at least one hydrophobic polymer; at least one solvent; if desired, at least one nonsolvent; and if desired at least one copolymer, all as defined above as per the first process.

The second solution is intended for the preparation of the separating layer. It comprises at least one copolymer; at least one solvent; if desired, at least one nonsolvent; and if desired, at least one hydrophobic polymer, all as defined above as per the first process. The copolymer concentration in the second solution is higher than that of the first solution. Coagulation of the second solution is performed by bringing the solution into contact with a coagulating liquid. Depending on whether the membrane prepared is a hollow fibre or a planar membrane, the coextrusion is performed through a die comprising concentric circular openings with a central channel for introducing the coagulating liquid, or slot-shaped parallel openings, respectively. Thus, coagulation can be performed simultaneously with coextrusion, or immediately thereafter, respectively.

The membranes according to the invention are advantageously employed in hemodialysis and/or ultrafiltration, or in plasmapheresis.

The examples which follow are given by way of illustration without limiting the present invention, and show how it can be put into practice.

EXAMPLES

The operating procedures employed for characterizing the exemplary membranes are as follows: *Surface chemical composition of the separating layer*

This is determined by photoelectron spectroscopy (ESCA). A surface region of approximately $150 \times 150$ $\mu m^2$ is examined The depth of the separating layer investigated is from approximately 50 to 100 angstroms under the general conditions of analysis. "Cs" denotes the mean copolymer concentration in the separating layer thus analyzed.

In addition, in the case of an ESCA analysis using angular distribution, it is generally possible to use extrapolation to determine the copolymer concentration in a separating layer of very small thickness, e.g. less than 10 angstroms. "Cos" denotes the copolymer concentration at the outermost surface of the layer. "Cm" denotes the mean mass concentration of copolymer in the membrane. In Examples 1-16 below, Cs, Cos and Cm are expressed in percentages by weight.

WETTABILITY

The wettability of the membrane is defined by the angle of contact $\theta$ of the liquid on the membrane. On a planar surface it is determined conventionally by depositing droplets of the liquid thereon. In the case of a hollow fibre, the determination of the wettability of the inner wall can be carried out by measuring the height of the capillary rise X wherein $X = 2\tau \cos\theta / \text{ogr}$, and g = acceleration of gravity;
$\tau$ = surface tension of the liquid;
o = density of the liquid; and
r = internal radius of the fibre.

However, due to the existence of a wall porosity the rise of the liquid in the inner conduit of the fibre occurs gradually. In practice, the value of X is measured 5 minutes after the liquid is brought into contact with the surface, this value approximating the equilibrium value after several hours. Wettability index WI is thus defined, such that $WI = \cos\theta$, wherein $\cos\theta$ is calculated according to the relationship shown above.

WI is an accurate indicator of the wettability of the inner wall of the fibre. In the case of a membrane in the form of a hollow fibre consisting of a hydrophobic polymer much as polyvinylidene fluoride or polyethersulphone, WI is between 0 and 0.2, inclusive. In the case of a membrane in the form of a hollow fibre consisting of a water wettable polymer such as a copolymer of acrylonitrile and sodium methallylsulphonate, WI is between 0.8 and 1, inclusive.

MECHANICAL CHARACTERISTICS

Tensile tests on a unit fibre by means of a tensiometer were used to determine the elasticity characteristics; Young's modulus E, and rupture characteristics, nominal stress $\sigma R$ and elongation $\epsilon R$. Ten specimens were tested for each sample prepared under the following conditions:
- temperature : 23° C.;
- working length (between jaws) : 10 cm;
- pulling speed : 0.5 cm/min.

A mean value was determined from the ten measured values.

DIMENSIONAL STABILITY

The dimensional change from the dry state to the wet state, resulting from an immersion in water for 40° C. for at least 24 hours, was determined on an unsupported membrane. $L_o$ is the length of the sample in the dry state. L is the length of the sample in the wet state. $\Delta L$, expressed (as a percentage) is equal to $(L-L_o)/L_o \times 100$.

The $\Delta L$ values obtained were always positive. The membranes according to the present invention did not exhibit any shrinkage under the conditions of this measurement.

HYDRAULIC PERMEABILITY

Hydraulic permeability is obtained by measuring the time t of filtration of a volume V of NaCl solution at a concentration of 9 g/l at a mean transmembrane pressure P of the order of 0.5 atm through a membrane surface area S. This permeability is defined by the ultrafiltration coefficient ($K_{uf}$) expressed in ml/h·m²·mm Hg·$K_{uf}=V/t$ P S.

DIFFUSIVE PERMEABILITY

Diffusive permeability is determined from the measurement of resistance to the transfer of solutes in solution between the solution compartment and the solvent compartment, which are separated by the membrane. The procedure is carried out at the same pressure and with the liquid flowing in the same direction in both compartments. The diffusive permeability, expressed in cm/min, is measured for the following solutes: urea (molecular mass 60) and vitamin B12 (molecular mass 1355).

REJECTION COEFFICIENT

The rejection coefficient (TR) is defined on the basis of the transmittance T, wherein TR (expressed as a percentage) $=(1 \times T) \times 100$. The transmittance represents the fraction of molecules passing by convection through the pores of the membrane. The rejection coefficient of the membrane is determined for an aqueous solution of bovine albumin (molecular mass in the order of 67,000) at a concentration of 5 g/l in the presence of NaCl (9 g/l). The transmembrane pressure is adjusted to obtain an ultrafiltration flow rate, expressed in cm³/s, which is constant per unit of membrane surface area and equal to $10^{-4}$ cm³/s·cm².

TOXICITY

Cytotoxicity test

The cytotoxicity of the eluates was evaluated qualitatively on MRC5 cells (human pulmonary fibroblasts). The membranes according to the invention were immersed for 24 hours in water at 70° C. according to DIN standard 58 352, part 3. The eluates were then brought into contact with a confluent layer of MRC5 cells. After incubation for 6 days at 37° C., the cytotoxicity was evaluated qualitatively by microscopic observation of the cell appearance. A scale from 0 to 4× was employed for the evaluation. None of the membranes was found to be cytotoxic.

HEMOLYSIS TEST

The experimental conditions employed are described in DIN standard 58 361, part 4. In accordance with this standard, the test was carried out on human blood. None of the eluates of the tested membranes caused hemolysis.

BIOCOMPATIBILITY

The blood biocompatibility of the membranes was evaluated by an ex-vivo test under dialysis conditions, with the difference that the blood was not restored to the volunteer. The ex-vivo test was performed for 30 minutes with a quantitative determination of the $\beta$TG, FPA, C3A and PMN elastase every 5 minutes beginning at time $=0$. A Tc (test) check was carried out before the dialyses was connected.

The hemodynamic conditions chosen for evaluating the biocompatibility of the membranes correspond to the clinical sessions on AN 69 with a shear rate of 360 $s^{-1}$. Only the polysulphone (PS) membrane marketed under the name FPS 600 by Fresenius was tested with a shear rate of 613 $s^{-1}$.

To differentiate, compare and evaluate the membranes as a function of their specific composition, the ex-vivo tests were carried out by taking into account the heparin sensitivity of the volunteers and their hematocrit at the time of the test. This allowed for the determination of the limiting heparination conditions, with a coagulation time ACT (Activated Cephalin Time) which was stable during the 30-minute test. The ex-vivo tests were carried out at the same hypocoagulation level for all the volunteers, a level obtained by doubling the initial ACT.

The results obtained, illustrated in FIGS. 1-4, are presented in comparison with those obtained on control membranes under the same operating conditions.

The following control membranes were used; a high-flow polysulphone membrane marketed under the name FPS 600 by Fresenius and referred to hereinbelow as "PS"; a membrane marketed by Enka under the name "Cuprophan" and denoted by "CUP" below; and a Hospal membrane, as disclosed in U.S. Pat. No. 4,749,619, based on a copolymer of acrylonitrile and sodium methallylsulphonate, and referred to as "AN69".

$\beta$-Thromboglobulin (TG) was determined by an immunoenzymatic method using an assay kit marketed under the name "Asserachrom® $\beta$TG" (reference 0419) by Diagnostica Stago.

The A-fibrinopeptide (FPA) was determined by an immunoenzymatic method using an assay kit marketed under the name "Asserachrom® FPA" (reference 0411) by Diagnostica Stago.

These two markers help characterize the thrombogenicity of a membrane. For example, platelet activation is generally manifested by the release or the generation of biological substances, in particular $\beta$-thromboglobulin ($\beta$TG). Plasmatic fibrinopeptide A (FPA) is an indicator of the activation of coagulation; it is the first peptide originating from the cleavage of fibrinogen in the way of obtaining the fibrin clot.

The activated protein C3A of the complement was determined by a radioimmunoassay method using an assay kit marketed under the name "Human Complement C3A des Arg (125) Assay System" (reference RPA·518) by Amersham.

dimethyl sulphoxide (DMSO) and Examples 15 and 16, where it is isopropanol (IP).

TABLE 2

| Example | Nature of polymer A | Solution composition % by weight | | | | Coagulating liquid composition % by weight | | |
|---|---|---|---|---|---|---|---|---|
| | | A | B | water | glycerol | NMP | water | organic solvent |
| 1 | Kynar 301F | 19.8 | 2.2 | 5 | 5 | 68 | 100 | 0 |
| 2 | Kynar 301F | 22.5 | 2.5 | 10 | 0 | 65 | 50 | 50 |
| 3 | Udel P 1700 | 26.6 | 1.4 | 3.5 | 3.5 | 65 | 100 | 0 |
| 4a | Kynar 301F | 18.8 | 2.2 | 0 | 0 | 79 | 75 | 25 |
| 4b | Kynar 301F | 18 | 2 | 4 | 0 | 76 | 75 | 25 |
| 5 | Kynar 301F | 25.2 | 2.8 | 5 | 5 | 62 | 50 | 50 |
| 6 | Kynar 710 | 20.9 | 1.1 | 5 | 5 | 68 | 100 | 0 |
| 7a | Kynar 301F | 20.9 | 1.1 | 5 | 5 | 68 | 100 | 0 |
| 7b | Kynar 301F | 19.8 | 2.2 | 5 | 5 | 68 | 100 | 0 |
| 7c | Kynar 301F | 17.6 | 4.4 | 3.5 | 3.5 | 71 | 100 | 0 |
| 8 | Udel P 1700 | 19.8 | 2.2 | 3.5 | 3.5 | 71 | 100 | 0 |
| 9 | Kynar 301F | 22.5 | 2.5 | 5 | 5 | 65 | 50 | 50 |
| 10a, b, c | Udel P 1700 | 23.75 | 1.25 | 3.5 | 3.5 | 68 | 50–100 | 50–0 |
| 11a, b, c, d | Kynar 301F | 20.9 | 1.1 | 5 | 5 | 68 | 100 | 0 |
| 12a, b, c | Kynar 301F | 19.8 | 2.2 | 5 | 5 | 68 | 100 | 0 |
| 13a, b, c | Udel P 1700 | 23.75 | 1.25 | 3.5 | 3.5 | 68 | 200 | 0 |
| 14 | Victrex 4800G | 25.2 | 2.8 | 3.5 | 3.5 | 65 | 50 | 50 |
| 15 | Victrex 4800G | 25.2 | 2.8 | 3.5 | 3.5 | 65 | 50 | 50 |
| 16 | Victrex 4800G | 22.5 | 2.5 | 3.5 | 3.5 | 68 | 50 | 50 |

The PMN elastase, a proteinase released by the polymorphonuclear (PMN) leukocytes, was determined by a "colorimetric immunoassay" method using a PMN elastase assay kit (ref. 12589) marketed by Merck.

The latter two substances are the best known and most sensitive indicators for characterizing the initiation of an immune reaction.

EXAMPLES 1-16

The hydrophobic polymers denoted "A" employed in the examples described below are polyvinylidene fluorides (PVDF), polysulphones (PSF) and polyethersulphones (PES). The PVDF's are marketed under the trademark Kynar by Pennwalt Corporation. The PSF's are marketed under the trademark Udel by Amoco Chemicals. The PES's are marketed under the trademark Victrex by Imperial Chemical Industries.

The polymer denoted "B" employed in Examples 1 to 15 is a copolymer based on acrylonitrile (AN) and sodium methallylsulphonate (MAS) having molar proportions AN/MAS 96.7/3.3 (referred to as "AN69"). It had an ionic capacity equal to 580 meg/kg.

The polymer "B" employed in Example 16 is a copolymer of acrylonitrile (AN) and sodium methallylsulphonate (MAS) having molar proportions AN/MAS 92.7/7.3 (referred to as "PAA 1200"). Its ionic capacity is 1200 meg/kg.

The values of the number-average (Mn) and weight-average (Mw) molecular mass of the polymers employed are shown in Table 1 below:

TABLE 1

| Nature of the polymer | Reference | Mn in daltons | Mw in daltons |
|---|---|---|---|
| PVDF | Kynar 301F | 60,000 | 350,000 |
| PVDF | Kynar 710 | 55,000 | 160,000 |
| PSF | Udel P 1700 | 22,000 | 71,000 |
| PES | Victrex 4800G | 31,000 | 77,000 |
| AN/MAS | AN 69 | 100,000 | 250,000 |
| AN/MAS | PAA 1200 | 120,000 | 300,000 |

The compositions of the solution and the coagulating liquid used in Examples 1 to 16 appear in Table 2 below.

The organic solvent forming part of the composition of the coagulating liquid is N-methyl 2-pyrrolidone (NMP) with the exception of Example 10, where it is

EXAMPLE 1

This example describes the preparation and the properties of a PVDF/AN69 membrane according to the invention.

The polymers, solvent and the nonsolvent were charged into a stirred reactor in the following proportions (expressed in percent by weight):

19.8% of Kynar 301F
2.2% of AN69
5% of water
5% of glycerol
68% of NMP.

The temperature was then raised to 100° C. and maintained for 4 hours. The polymer solution obtained was filtered and then stored at 60° C., which was the spinning temperature. The viscosity of the solution at 60° C. was 10 pascal seconds (pa.s).

During the spinning operation, the polymer solution was introduced into a temperature controlled loading funnel at 60° C. An annular slot die having an external diameter DE = 535 μm and an internal diameter DI = 350 μm was fed by means of a pump. The coagulating liquid which was, water, was injected through the axial orifice of the die, having a diameter D = 185 μm. The polymer solution flow rate QC was 0.74 ml/min. The coagulating liquid flow rate QL was 1.48 ml/min.

On leaving the die, the nascent fibre traversed a distance L of 90 cm in the surrounding air before entering an external coagulating bath which contained water. The spinning speed SS was approximately 11 m/min.

The fibre was then guided by rollers and driven towards a water washer before being received on a reel. Drying was then carried out at room temperature. At the end of these steps, the content of residual organic solvent was less than 0.01%. The fibre thus obtained had an inner skin and a finger-type structure which widened from the inner wall extending to the outer surface. The internal diameter (di) was 218 μm and its external diameter (de) was 346 μm. The following characteristics of the thus obtained fibre were also determined:

wettability index WI=0.54; measn AN69 concentration in the surface layer of the inner wall Cs=25%
hydraulic permeability $K_{uf}$=330 ml/h m$^2$·mm Hg;
diffusive permeability to urea : 0.11 cm/min;
diffusive permeability to vitamin B 12 : 0.02 cm/min;
rejection coefficient for bovine albumin TR=93%;
mechanical characteristics: E=130 MPa; $\sigma$R=3.8 MPa;$\epsilon$R=91%.

The surface enrichment in acrylonitrile copolymer was demonstrated by the relatively high value of the wettability index and the mean concentration of AN69 polymer in the separating layer (2.5 times higher than the mass concentration Cm, which is 10%).

The mean concentration Cs of 25% was lower than the AN69 content at the outermost surface. The angular variation ESCA analysis gave a Cos=32%. These characteristics may explain why, when spontaneously wetted with water, the fibre obtained produces a convective and diffusive transfer without requiring a pretreatment with a wetting liquid medium such as a water-alcohol mixture or aqueous surfactant solutions.

Since the acrylonitrile copolymer employed is water-insoluble, the membrane properties do not change appreciably when the fibre is used in the presence of aqueous media. In addition, this membrane had very good dimensional stability, e.g. the dimensional change under the above mentioned conditions was lower than 0.6%, as well as good mechanical characteristics.

In Examples 2 to 16 described below, the operating procedure was identical to that described in Example 1. Thus, only the specific conditions differing from Example 1 are described.

EXAMPLE 2

This example shows the existence of a concentration gradient of acrylonitrile copolymer in the surface layer of the membrane according to the invention.

A hollow fibre was produced according to the operating procedure of Example 1 with the following particular conditions: The temperature of the stirred reactor into which the polymers, solvent and the nonsolvent are charged ("T1")=120° C. Storage temperature of the filtered solution which is also the spinning temperature T2=120° C.; L=30 cm. The hollow fibre produced had a hydraulic permeability of 460 ml/h·m$^2$·mm Hg, and a wettability index of 0.45. An ESCA analysis of the inner wall of the fibre was carried out under the particular conditions of variation of the angle of analysis. Since the mean free path of the electrons in the material was not accurately known, only an estimate of the depth of analysis was available. This analysis yielded the following results.

| Angle | Order of magnitude of the depth analyzed in angstroms | Surface AN 69 concentration: Cs |
|---|---|---|
| 90° | 100 | 26.5 |
| 35° | 60 | 31 |
| 5° | 10 | 35 |

A concentration gradient of acrylonitrile copolymer existed in the separating layer, the content being proportionately higher the thinner the layer (the thickness is measured from the surface). By extrapolation to zero thickness, it was determined that the concentration at the outermost surface of the separating layer, Cos, was approximately 36%.

EXAMPLE 3

This example demonstrates the enrichment in acrylonitrile copolymer of the inner wall of a PSF/AN69 hollow fibre according to the present invention.

The viscosity of the polymer solution was 13 Pa.s at 60° C. The spinning conditions employed were identical to those in Example 1, with the exception of the following particular conditions. The solution flow rate and internal liquid flow rate were, respectively, QC equal to 0.64 ml/min, and QL equal to 1.12 ml/min. The fibre thus obtained was of an asymmetric type with an alveolar structure having a skin on the inner wall. The characteristics of the thus obtained fibre were as follows:
di=250 μm; de=335 μm;
$K_{uf}$=76 ml/m$^2$·h·mm Hg;
WI=0.48; and
Cs=33%

The enrichment in acrylonitrile copolymer was also observed in the separating layer, the Cs/Cm ratio of this fibre being 6.6 (Cm corresponds to the mean mass concentration of copolymer in the fibre). As for the fibre of Example 1, this resulted in a spontaneous and durable wettability of the fibre by water. The fibre according to this Example also exhibited good dimensional stability (the dimensional change is lower than 0.2%), and good mechanical characteristics.

EXAMPLE 4

This example shows the effect of the addition of nonsolvent to the polymer solution.

Two hollow fibres were produced from solutions 4a and 4b respectively. Solution 4a, without a nonsolvent, was opalescent. Solution 4b, containing 4% by weight of water, was cloudy. These two solutions were spun according to the operating procedure of Example 1 with T2=25° C. and L=10 cm. The surface characteristics of these fibres were as follows:
Fibre 4a; WI=0.2
Fibre 4b; WI=0.59

The presence of nonsolvent in the solution (fibre 4b) had a favorable effect on the surface enrichment. Conversely, the absence of nonsolvent resulted in a more homogeneous solution, and a much lower enrichment, and thus insufficient wettability.

EXAMPLE 5

This example shows the use of a more concentrated polymer solution for the production of a PVDF/AN 69 fibre. At a polymer concentration of 28%, the solution was particularly cloudy.

The particular spinning conditions employed were T1=110° C.; T2=105° C.; and L=40 cm. The characteristics of the fibre obtained were $K_{uf}$=110 ml/h·m$^2$mm Hg; and WI=0.51. The obtained membrane had good dimensional stability and good mechanical characteristics.

EXAMPLE 6

This example shows the use of a PVDF polymer of lower molecular mass than Kynar 301F.

The use of Kynar 710 results in the spinning parameters being set at T2=90° C. and L=40 cm. The characteristics of the fibre obtained were as follows:
di=252 μm; de=400 μm;
WI=0.57;
Cs=10%;
$K_{uf}$=31 ml/h·m$^2$·mm Hg;

TR=97%.

Although the apparent degree of enrichment Cs/Cm was only 2, the high value of the wettability index showed that the value of Cs at the outermost surface of the fibre was in reality significantly higher. In addition, the fibre obtained had good mechanical characteristics and good dimensional stability.

EXAMPLE 7

This example shows the production of fibres according to the invention with various proportions of PVDF polymer and AN69 copolymer.

The operating conditions were identical to those of Example 1. The properties of the fibres with a weight content (Cm) of AN69 of 5, 10 and 20% are shown in Table 3.

TABLE 3

| Fibre | PVDF/AN69 | di μm | de μm | Cs % | Cos % | WI | Kuf | TR % | L % |
|---|---|---|---|---|---|---|---|---|---|
| 7a | 95/5 | 270 | 384 | 11 | 34 | 0.62 | 233 | 78 | 0.3 |
| 7b | 90/10 | 218 | 346 | 25 | 32 | 0.54 | 330 | 93 | 0.6 |
| 7c | 80/20 | 218 | 330 | 32 | 38 | 0.45 | 337 | 97 | 1.3 |

$K_{uf}$ is expressed in ml/h.m².mm Hg.

The fibres had surface characteristics, a permeability, and a dimensional stability when they a change from the dry state into the wet state, well adapted to hemodialysis.

The results of evaluation tests of the biocompatibility of fibres 7a (95/5) and 7c (80/20) are illustrated in FIGS. 1, 2, 3 and 4.

FIG. 1 shows that the βTG contents observed with the two fibres 7a (95/5) and 7c (80/20) were of the same order as those observed with AN69. They lie fairly significantly below those of the cuprophan and polysulphone dialyses. The two fibres 7a and 7c exhibited good behavior, very close to that of AN69. They induced little platelet activation which is measured indirectly by a release of βTG.

Figure 2:
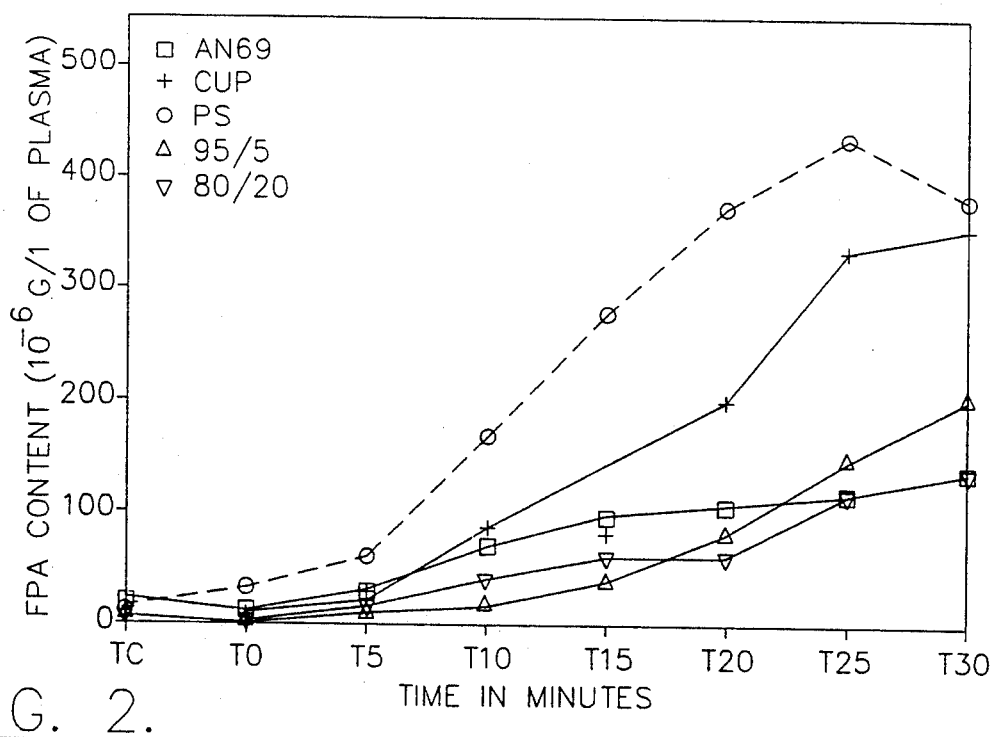
FIG. 2 is a graph illustrating the change in the concentration of FPA (A-fibrinopeptide) in an ex-vivo blood sample per unit time when subjected to dialysis using membranes according to the present invention and control membranes.

FIG. 2 illustrates that the behavior of fibres 7a (95/5) and 7c (80/20) was good, since the FPA level was relatively low, and corresponded to that of AN69. It was also below that of the cuprophan and polysulphone dialyses.

Figure 3:
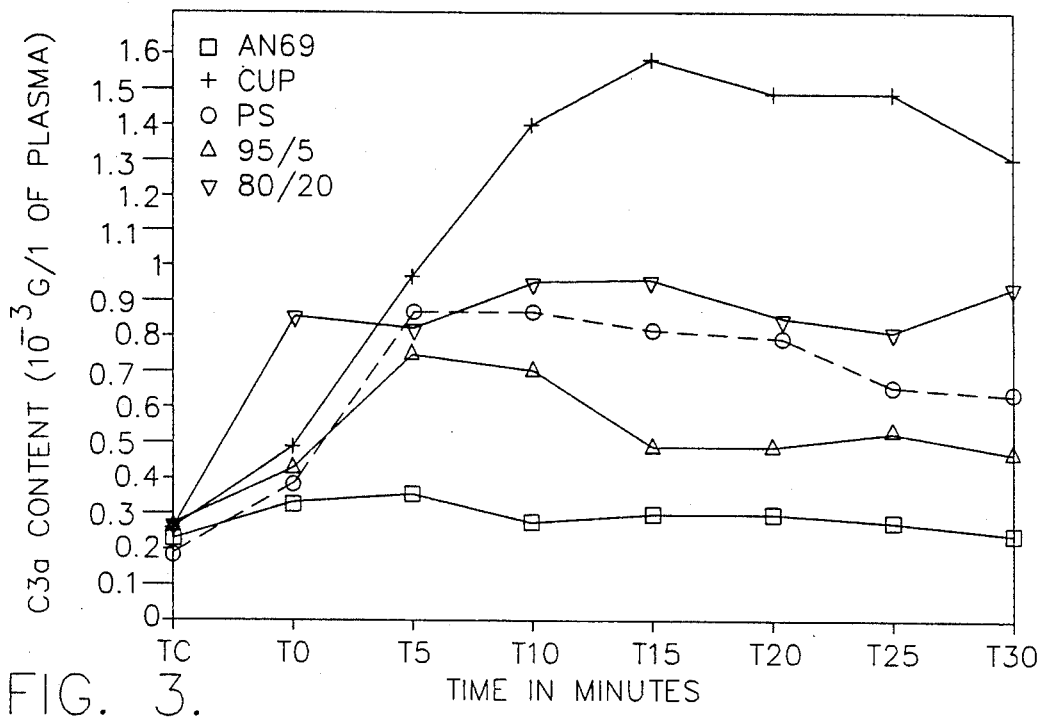
FIG. 3 is a graph illustrating the change in the concentration of C3A (human activated complement protein) in an ex-vivo blood sample per unit time when subjected to dialysis using membranes according to the present invention and control membranes.

FIG. 3 illustrates that the two fibres 7a (95/5) and 7c (80/20) both activated the complement system moderately. Fibre 95/5 lies in an intermediate position between AN69 and the polysulphone. Fibre 80/20 departs further from the performance of AN69, and induced a slightly higher rate of C3a generation than the polysulphone.

Figure 4:
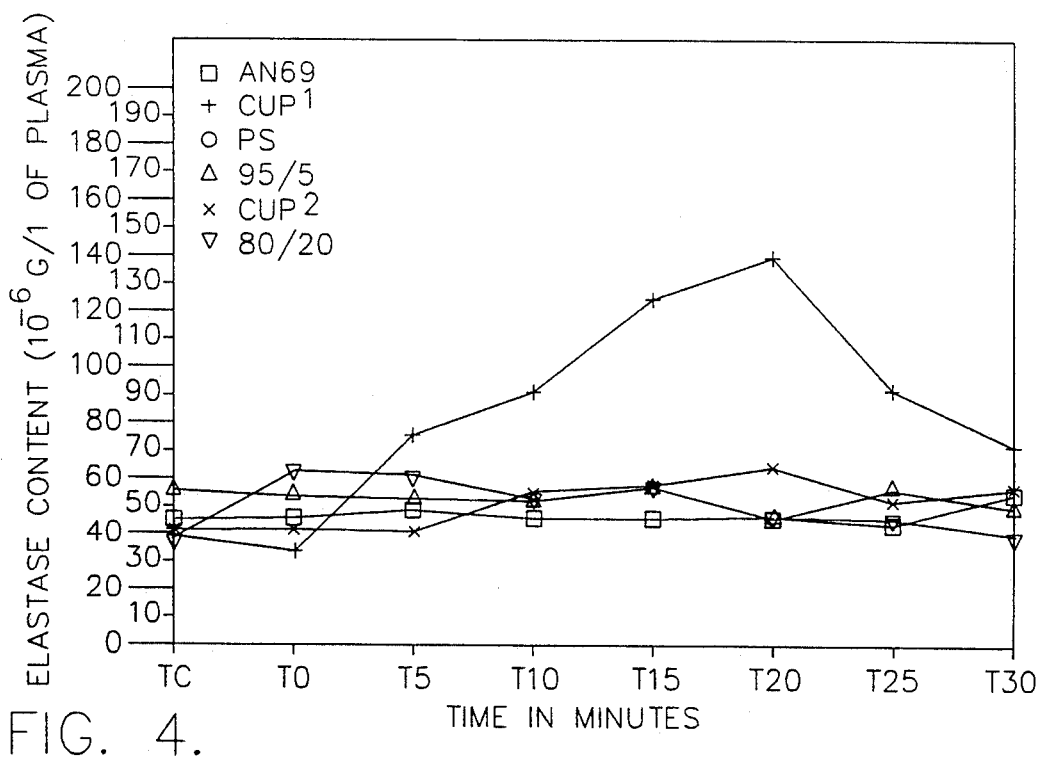
FIG. 4 is a graph illustrating the change in the concentration of PMN elastase in an ex-vivo blood sample per unit time when subjected to dialysis using membranes according to the present invention and control membranes.

FIG. 4 shows that the two fibers 7a (95/5) and 7c (80/20) were indistinguishable from materials such as polysulphone and AN69 in terms of not inducing any activation of leukocytes which were measured by the release of PMN elastase. Only the cuprophan caused the release of PMN elastase in some of the tests.

EXAMPLE 8

This example describes a 90/10 PSF/AN69 fibre according to the present invention. The operating conditions were identical to those of Example 3, with the difference that the polymer concentration in the solution was 22% by weight. The solution was very cloudy because of the incompatibility of the constituent polymers.

In this example, the hollow fibre produced had a wettability index of 0.63 and a hydraulic permeability of 67 ml/h.m².mm Hg, a good dimensional stability (dimensional change lower than 0.3%) and good mechanical characteristics (E=560 MPa; σR=12 MPa; εR=15%).

EXAMPLE 9

This example shows the difference in composition between the inner surface and the outer surface of a hollow fibre according to the present invention.

The fibre was produced according to the operating procedure of Example 1 with the particular conditions: T1=120° C.; T2=120° C.; and L=40 cm.

An ESCA analysis determination of the surface AN69 concentration on the two faces of the membrane yielded an inner surface Cs=28%; and outer surface Cs=6.5%.

In relation to the AN69 mass concentration (Cm) of 10%, an enrichment was found at the inner surface and a depletion at the outer surface.

EXAMPLE 10

This example shows the effect of the composition of the coagulating fluid.

The production of hollow fibres having a composition 95/5 PSF/AN69 was carried out under the operating conditions of Example 1. The composition of the internal liquid, consisting of water and of dimethyl sulphoxide (DMS0), was varied. This variation affected the value of the wettability index, as shown in Table 5.

TABLE 5

| Fibre | Composition of the inner liquid in % by weight | | WI |
|---|---|---|---|
| | DMSO | water | |
| 10a | 50% | 50% | 0.45 |
| 10b | 35% | 65% | 0.48 |
| 10c | — | 100% | 0.59 |

The increase in the WI produced by an increase in the water content in the coagulating fluid indicates a higher enrichment in acrylonitrile copolymer at the outermost surface of the separating layer.

EXAMPLE 11

This example shows the effect of the solution flow rate QC in the annular die on the characteristics of 95/5 PVDF/AN 69 fibres.

Hollow fibres were spun under the conditions of Example 1, except for the solution flow rate which was varied. The QL/QC ratio was kept constant.

The properties of the fibres obtained are shown in Table 6.

TABLE 6

| Fibre | QC ml/min | di μm | de μm | WI | $K_{uf}$ ml/h.m².mm Hg |
|---|---|---|---|---|---|
| 11a | 0.64 | 269 | 373 | 0.62 | 233 |
| 11b | 0.74 | 299 | 414 | 0.50 | 181 |
| 11c | 0.87 | 308 | 438 | 0.48 | 215 |
| 11d | 1.07 | 305 | 460 | 0.44 | — |

The speed of spinning was kept constant; however, the increase in the flow rate QC produced an increase in the dimensions of the hollow fibre and a decrease in the wettability index. The search for the best possible degree of enrichment in acrylonitrile copolymer resulted in the solution flow rate being kept at a sufficiently low level.

EXAMPLE 12

This example shows the effect of the flow rate of the coagulating liquid, QL. Hollow fibres were spun under the conditions of Example 1, except for the flow rate QL of coagulating liquid, which was varied. The flow rate of the solution QC was fixed at a sufficiently low value.

The properties of the fibres obtained are shown in

TABLE 7

| Fibre | QL ml/min | di μm | de μm | WI | $K_{uf}$ml/h.m$_2$.mm H |
|---|---|---|---|---|---|
| 12a | 1.12 | 238 | 370 | 0.44 | 139 |
| 12b | 1.48 | 299 | 414 | 0.57 | 218 |
| 12c | 2.16 | 371 | 471 | 0.59 | 318 |

The increase in QL produced a better surface enrichment in acrylonitrile copolymer (increase in WI). A sufficient input of coagulating liquid is needed at the die exit for the affinity of the AN 69 polymer for this water-containing liquid to give rise to the required surface enrichment.

EXAMPLE 13

This example shows the effect of the solution flow rate Qc in the annular die on the characteristics of 95/5 PSF/AN69 fibres.

Hollow fibres were spun under the conditions of Example 1, except for the solution flow rate, which was varied. The QL/QC ratio was kept constant.

The measured characteristics are listed in Table 8.

TABLE 8

| Fibre | QC ml/min | WI | Cos | $K_{uf}$ml/h.m$^2$.mm Hg |
|---|---|---|---|---|
| 13a | 0.8 | 0.85 | 41 | 20 |
| 13b | 0.87 | 0.75 | 36 | 18 |
| 13c | 1.2 | 0.41 | 18 | 14 |

The surface enrichment in acrylonitrile copolymer was proportionately greater as the solution flow rate decreased.

EXAMPLE 14

This example shows the existence of an enrichment in acrylonitrile copolymer of the inner wall of a PES/AN 69 hollow fibre according to the present invention. The viscosity of the polymer solution was 7.5 Pa s at 60° C.

The spinning conditions employed were identical to those of Example 1, with the exception of the coagulating liquid flow rate QL, which was 1.26 ml/min.

The thus obtained fibre was of an asymmetric type with an alveolar structure having a skin on the inner wall. It had an internal diameter (di) of 315 μm, and an external diameter (de) equal to 403 μm. The following characteristics were also determined:
wettability index WI=0.69;
mean AN 69 concentration in the surface layer of the inner wall Cs=29.5%;
AN 69 concentration at the outermost surface of the inner wall Cos=37%;
hydraulic permeability $K_{uf}$=25 ml/h m$^2$ mm Hg;
rejection coefficient for bovine albumin TR=95%; and
mechanical characteristics: E=490 MPa; σR= 11 MPa; and εR=27%.

The surface enrichment in acrylonitrile copolymer corresponded to an outermost surface content which was 3.7 times higher than the mass content. In addition, this fibre had good mechanical characteristics.

EXAMPLE 15

The operating conditions of Example 14 were employed, with the exception of the internal coagulating liquid flow rate AL which was 1.12 ml/min, and a spinning speed of 15 m/min. The following characteristics were determined:
di=249μm; de=329 μm;
wettability index WI=0.63;
surface copolymer concentration, Cs=28.5% and Cos =36%;
hydraulic permeability $K_{uf}$=25ml/h m$_2$mm Hg; and rejection coefficient for bovine albumin TR=97%.

In this example, the replacement of the water/NMP (50/50) coagulating liquid employed in Example 14 with a water/isopropanol (50/50) coagulating liquid also resulted in a hollow fibre which had the desired characteristics.

EXAMPLE 16

In this example, the acrylonitrile copolymer used was PAPA 1200. The spinning operating conditions employed were those of Example 1. The thus obtained fibre was of an asymmetric type with an alveolar structure having a skin on the inner wall. It had an internal diameter (di) of 260 μm and an alveolar diameter (de) equal to 343 μm. The wettability index WI was 0.66. The hydraulic permeability $K_{uf}$=60 ml/h.m$_2$.mmHg.

Claims:

1. An asymmetric semipermeable membrane suitable for the treatment of biological liquids, comprising a support layer and at least one dense, mesoporous or microporous surface layer defining a separating layer,
    said membrane containing at least one hydrophobic polymer and at least one water-insoluble copolymer;
    said copolymer comprising acrylonitrile and at least one sulphonic monomer,
    wherein the concentration of copolymer in the outer surface of said separating layer is higher than the mean copolymer concentration in the membrane as a whole;
    said membrane being water-wettable in the dry state; and
    wherein said copolymer and said hydrophobic polymer are present in said membrane in relative proportions such that the dimensional change of said membrane when unsupported does not exceed +3% when it changes from the dry state to the wet state at 40° C.

2. A membrane according to claim 1, wherein said outer surface of said separating layer has a concentration of copolymer greater than 30% by weight.

3. A membrane according to claim 1, wherein said membrane has a mean copolymer concentration that does not exceed 40% by weight.

4. A membrane according to claim 1, wherein said hydrophobic polymer is selected such that said membrane exhibits a change in thickness or length not exceeding 0.5% when said membrane changes from the dry state to the wet state at 40° C.

5. A membrane according to claim 1, wherein said hydrophobic polymer is a polyarylsulphone.

6. A membrane according to claim 5, wherein said polyarylsulphone is a polyethersulphone.

7. A membrane according to claim 5, wherein the weight ratio of said polyarylsulphone to said copolymer is between 60/40 and 99/1.

8. A membrane according to claim 1 wherein said hydrophobic polymer is a polyvinylidene fluoride.

9. A membrane according to claim 8, wherein the weight ratio of said polyvinylidene fluoride to said copolymer is between 70/30 and 99/1.

10. A membrane according to claim 1, wherein the proportion of said sulphonic monomer in said copolymer is between 1 and 50% wt. of said copolymer.

11. A membrane according to claim 10, wherein the proportion of said sulphonic monomer in said copolymer is between 3 and 15 wt%.

12. A membrane according to claim 1 wherein said hydrophobic polymer is a polyvinyl chloride.

13. A membrane according to claim 1, wherein said sulphonic monomer is methallylsulphonate.

14. A membrane according to claim 1, wherein said sulfonic monomer is salified.

15. A membrane according to claim 1, wherein said copolymer further comprises a nonionic, nonionizable, olefinically unsaturated comonomer.

16. An artificial kidney comprising the membrane of claim 1.

17. An ultrafiltration device comprising the membrane of claim 1.

18. A hemodialysis device comprising the membrane of claim 1.

19. A plasmapheresis device comprising the membrane of claim 1.

20. A method of treating a biological fluid comprising contacting said fluid with a membrane of claim 1.

21. A method of claim 20, wherein the fluid is blood.

22. A method of claim 20, wherein the fluid is plasma.

23. A process for the preparation of an asymmetric, semipermeable membrane comprising a support layer and at least one dense, mesoporous or microporous surface layer defining a separating layer, comprising the steps of:
preparing a solution containing at least one hydrophobic polymer; at least one water-insoluble copolymer, the copolymer comprising acrylonitrile and at least one sulphonic monomer, the polymer and copolymer present in respective proportions such that the dimensional variation of the membrane thus produced does not exceed +3% when it changes from the dry state to the wet state at 40° C.; at least one organic solvent for the hydrophobic polymer and the copolymer having a boiling temperature higher than the processing temperature of the solution; and at least one nonsolvent for the hydrophobic polymer miscible with the organic solvent; wherein the hydrophobic polymer, copolymer, organic solvent and nonsolvent are present in said solution in respective amounts such that the thus obtained solution is thermodynamically unstable and cloudy, but macroscopically homogeneous, does not give rise to demixing at the processing temperature of the solution, and where a lowering of the temperature of the solution would spontaneously cause gelification of the solution;
extruding the thus obtained solution,
coagulating the thus extruded solution for a period of time sufficient to produce a solidified membrane product; and
washing the thus obtained membrane.

24. A process according to claim 23, wherein the total content of hydrophobic polymer and copolymer present in the solution is between 10 and 30% by weight of the solution.

25. A process according to claim 24, wherein the total content of hydrophobic polymer and copolymer in the solution is between 20 and 28% by weight of the solution.

26. A process according to claim 23, wherein the nonsolvent is present in the solution in an amount between 2 and 20% by weight.

27. A process according to claim 23, wherein the nonsolvent is water.

28. A process according to claim 23, wherein the nonsolvent comprises a mixture of water and glycerine.

29. A process according to claim 23, wherein the step of coagulating comprises contacting the thus extruded product with a coagulation liquid containing water.

30. A process according to claim 23, wherein the step of coagulating comprises contacting the thus extruded product with a liquid containing at least 50% by weight of water.

31. A process according to claim 23, wherein said extruding is performed at an extrusion speed not greater than 20 m/min.

32. A process according to claim 23, wherein said coagulating comprises maintaining a high flow rat=of coagulating liquid to maximize the retention of the precipitating properties of the coagulating liquid.

33. A process according to claim 23, wherein the sulfonic monomer is salified.

34. A process according to claim 23, wherein the copolymer further comprises a nonionic, nonionizable, olefinically unsaturated monomer.

35. A process according to claim 23, wherein said extruding is performed through a die.

36. A process according to claim 16, wherein said coagulating comprises contacting the thus extruded product with a liquid coagulant chemically inert to the hydrophobic polymer and the copolymer, and for which the hydrophobic polymer has substantially no affinity, and for which the copolymer has an affinity but is insoluble therein.

37. A process according to claim 23, further comprising the step of drying the thus washed membrane.

38. A process for the preparation of an asymmetric, semipermeable membrane comprising a support layer and at least one dense, mesoporous or microporous surface layer defining a separating layer comprising the steps of:
preparing a first solution comprising at least one hydrophobic polymer, and at least one organic solvent for the hydrophobic polymer the solvent having a boiling temperature higher than the processing temperature of the first solution;
preparing a second solution comprising at least one water-insoluble copolymer based on acrylonitrile and at least one sulphonic monomer at least one organic solvent for the copolymer and for the hydrophobic polymer having a boiling temperature highest than the processing temperature of the solution, wherein at least one of the first and the second solutions further comprises at least one nonsolvent for the hydrophobic polymer miscible with both the organic solvent for the hydrophobic polymer and the organic solvent for the copolymer, and wherein the organic solvent in the first solution is a solvent for the copolymer;

mixing the first solution and the second solution wherein the copolymer and the hydrophobic polymer are present in the thus mixed solution in respective proportions that the dimensional variation of the membrane ultimately produced does not exceed +3% when the membrane changes from the dry state to the wet state at 40° C.; and wherein the hydrophobic polymer, the copolymer, the solvent and the nonsolvent are present in the thus mixed solution in respective amounts such that the solution is thermodynamically unstable and cloudy, but macroscopically homogeneous, does not give rise to demixing at the processing temperature of the solution. and where a lowering of the solution temperature would spontaneously cause gelification of the solution;

extruding the thus obtained solution; coagulating the thus extruded solution for a period of time sufficient to produce a solidified membrane product; and washing the thus obtained membrane.

39. A process according to claim 38, wherein said extruding is performed through a die.

40. A process according to claim 38, wherein said coagulating comprises contacting the thus extruded product with a liquid coagulant chemically inert to the hydrophobic polymer and to the copolymer, and for which the hydrophobic polymer has substantially no affinity, and for which the copolymer has an affinity but is insoluble therein.

41. A process according to claim 38, further comprising the step of drying the thus washed membrane.

42. A process according to claim 38, wherein the first solution further comprises at least one nonsolvent for the hydrophobic polymer miscible with the organic solvent.

43. A process according to claim 38, wherein the second solution further comprises at least one nonsolvent for the hydrophobic polymer miscible with the organic solvent.

44. A process according to claim 38, wherein the second solution further comprises a nonsolvent for the copolymer miscible with the organic solvent.

45. A multilayered asymmetrical semipermeable, water-wettable membrane suitable for the treatment of biological fluids comprising a support layer, and at least one dense mesoporous or microporous separating layer said membrane comprising:

at least one hydrophobic polymer selected from the group consisting of polyarylsulphone, polyvinylidene fluoride and polyvinyl chloride, and at least one water-insoluble copolymer comprising acrylonitrile and at least one sulfonic acid monomer selected from the group consisting of methallylsulphonic, vinylsulphonic, allylsulphonic and styrene-sulphonic, said copolymer having a higher concentration at the outer surface of said separating layer than the mean copolymer concentration in the membrane as a whole, and wherein said copolymer and said hydrophobic polymer are present in relative portions such that the dimensional change of said membrane when unsupported does not exceed +3% when it changes from the dry state to the wet state at 40° C.

* * * * *